(No Model.)
S. S. JONES & C. M. RITTENHOUSE.
COUPLING FOR PIPES.
No. 260,874.　　　　　　　　　　Patented July 11, 1882.
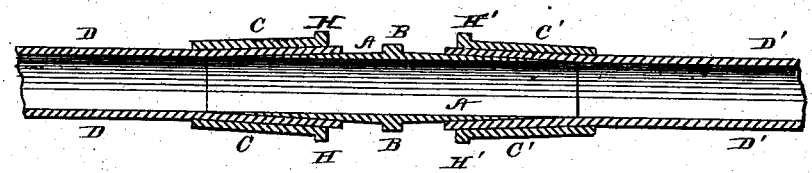
Witnesses.
Edwin L. Yerrell
J. J. McCarthy
Inventors,
Samuel S. Jones
Charles M. Rittenhouse
per George E. Buckley
their atty.

UNITED STATES PATENT OFFICE.

SAMUEL S. JONES AND CHARLES M. RITTENHOUSE, OF NORRISTOWN, PA.

COUPLING FOR PIPES.

SPECIFICATION forming part of Letters Patent No. 260,874, dated July 11, 1882.

Application filed February 11, 1882. (No model.)

*To all whom it may concern:*

Be it known that we, SAMUEL S. JONES and CHARLES M. RITTENHOUSE, of the borough of Norristown, Montgomery county, State of Pennsylvania, have invented certain new and useful Improvements in Couplings for Lead and other Metal Pipes; and we do hereby declare the following to be a full, clear, and exact description of the same, reference being had to the annexed drawing, making part hereof.

The nature of our invention will be fully shown by the following description and claim.

In the drawing, Figure 1 represents our coupling in place connecting the adjoining ends of two sections of lead pipe.

A is an inner ferrule, being a true cylinder upon its inner surface, but tapering from the shoulder B upon its outside to its respective ends.

C C' are two slightly tapering clamp or jam collars, having the same taper respectively as the outer taper of ferrule A, but being larger in diameter than the latter.

D D' are two sections of lead pipe, joined by the coupling and forming a joint without soldering.

The application of our coupling to make a close joint between the ends of pipes is as follows: The smallest inner diameters of the respective collars C C' are slightly larger than the largest diameter of the tubes or pipes to be joined. One of these collars is first slipped over the end of each of the pipes to be joined and pushed back away from the end to some distance—say four to six inches—with the flaring end of the collar toward the end of the pipe upon which it is placed. The double-ended ferrule (outwardly tapering toward both ends from about the middle) is of about the same outward diameter at its ends as the inner diameters of the pipes to be joined. To join the pipes each end of the ferrule is driven or wedged into the end of its respective pipe until each pipe end envelops the ferrule nearly up to the middle of the latter. The pipe ends will now have a flare corresponding with the taper of the enveloped ferrule ends. The flaring jam-collars C C' are now drawn toward the respective pipe ends, and, by means of a clamping-tool, chisel and hammer, large nippers, or other convenient means, bearing against flanges H H', which will suggest themselves to the mind of a skilled mechanic, are forced up on the flaring ends of the pipes, whereby the latter are tightly jammed between the interior ferrule and the outwardly enveloping collars C C'. In the case of lead and other soft-metal pipes a perfectly-tight joint is thus formed. The collars C C', Fig. 1, are provided with flanges H H', and, if desired, an ordinary clamp or clamps can be employed to lap over these flanges and prevent the collars from slipping back and thus loosening the joint.

A middle outward flange, B, can be employed on the ferrule A, as shown in Fig. 1, and the pipes driven up against it before the jam-collars are driven up, if desired.

We are well aware that right and left double-threaded ferrules have been used heretofore to join tubing or piping; but we do not claim these.

The flanges H H' are very essential in driving up the two collars, as they furnish a rest or hold for the tool, which is struck in driving. We find it highly important, also, to maintain about the same taper in the interior of the collars C C' as the taper of the ferrule A, so that the soft lead pipe between may simply be jammed or crushed between the two flared surfaces—viz., the inner surface of the collar and the outer surface of the ferrule. If this taper is not so maintained, the edge of the collar will cut the pipe as it is being driven on, instead of crushing or jamming it, thus leaving a joint which is liable to leak, and leaving the collar liable to slide back through not being jammed. A screw-thread in the interior of the collar will also cut the lead.

We are also aware of Letters Patent Nos. 66,658 and 198,726; but we do not claim these.

What we claim as new is—

In a coupling for tubes and pipes, the combination of the double-tapered hollow plain ferrule A and the correspondingly-flared plain collars C C', having flanges or shoulders H H', adapted to be driven up by blows struck upon the flanges, and all adapted to hold and crush or jam the ends of two pipes to form a close joint, in the manner described.

SAML. S. JONES.
CHARLES M. RITTENHOUSE.

Witnesses:
ROBERT EDMUNDS, Jr.,
J. C. SNYDER.